United States Patent
Gleyze

(10) Patent No.: US 9,096,311 B2
(45) Date of Patent: Aug. 4, 2015

(54) METHOD FOR ADJUSTING THE DOORS OF A LANDING GEAR BAY, AND ASSOCIATED DOOR

(75) Inventor: Gilbert Gleyze, Ceaux en Couhe (FR)

(73) Assignee: Airbus Operations (SAS), Toulouse (FR)

( * ) Notice: Subject to any disclaimer, the term of this patent is extended or adjusted under 35 U.S.C. 154(b) by 172 days.

(21) Appl. No.: 13/808,156

(22) PCT Filed: Jul. 5, 2011

(86) PCT No.: PCT/FR2011/051577
§ 371 (c)(1),
(2), (4) Date: Jan. 3, 2013

(87) PCT Pub. No.: WO2012/004510
PCT Pub. Date: Jan. 12, 2012

(65) Prior Publication Data
US 2013/0099052 A1    Apr. 25, 2013

(30) Foreign Application Priority Data
Jul. 9, 2010 (FR) .................................. 10 55634

(51) Int. Cl.
*B64C 25/16* (2006.01)
*B64C 25/00* (2006.01)
*B64F 5/00* (2006.01)

(52) U.S. Cl.
CPC ............... *B64C 25/001* (2013.01); *B64C 25/16* (2013.01); *B64F 5/0045* (2013.01)

(58) Field of Classification Search
CPC   B64C 1/1446; B64C 25/16; B64C 2025/001; B64C 2025/003
USPC .......... 244/100 R, 102 A, 129.1, 129.4, 129.5
See application file for complete search history.

(56) References Cited

U.S. PATENT DOCUMENTS

| | | | |
|---|---|---|---|
| 4,845,804 A  * | 7/1989 | Garrett ............................. | 16/19 |
| 6,213,428 B1 | 4/2001 | Chaumel et al. | |
| 2005/0103937 A1 | 5/2005 | Briancourt | |
| 2008/0173760 A1 | 7/2008 | Ponsart et al. | |
| 2009/0008501 A1 | 1/2009 | Chow et al. | |

FOREIGN PATENT DOCUMENTS

| | | |
|---|---|---|
| EP | 0 980 822 | 2/2000 |
| FR | 2 911 321 | 7/2008 |
| WO | WO 03/089297 | 10/2003 |

OTHER PUBLICATIONS
International Search Report for PCT/FR2011/051577 mailed Oct. 19, 2011.

\* cited by examiner

*Primary Examiner* — Philip J Bonzell
*Assistant Examiner* — Nicholas McFall
(74) *Attorney, Agent, or Firm* — Nixon & Vanderhye P.C.

(57) ABSTRACT

The aim of the invention is to allow the set of doors to be adjusted without increasing the number of landing gear retraction/extension maneuvers, by incorporating a specific entrance in the fairing (2) of the landing gear bay (4) that provides access to the different accessories (14, 17*a*, 17*b*) used to adjust the doors (21-25). The method of the invention consists in: providing a removable bodywork element (5) which is inserted into the fairing (2) of a landing gear bay, surrounded by a stiffening structure (7) and of sufficient dimension such that the adjustment levers (14, 17*a*, 17*b*) can be reached from the outside; accessing the inside of the bay (4) by retracting the removable bodywork element (5); and using the levers (14, 17*a*, 17*b*) to adjust the different doors (21 to 25) in a flush aerodynamic position, as well as the clearances between said doors. In one embodiment of the invention, one door (25) comprises a central bodywork portion (5) and a peripheral portion (7) including stiffening means (70). The peripheral portion (7) is surrounded by a seal (30) that bears on the other doors (21-24) via the stiffening means (70) and the central portion (5) is coupled to the peripheral portion (7) by removable separation means (6).

12 Claims, 2 Drawing Sheets

METHOD FOR ADJUSTING THE DOORS OF A LANDING GEAR BAY, AND ASSOCIATED DOOR

This application is the U.S. national phase of International Application No. PCT/FR2011/051577 filed 5 Jul. 2011 which designated the U.S. and claims priority to FR 1055634 filed 9 Jul. 2010, the entire contents of each of which are hereby incorporated by reference.

TECHNICAL FIELD

The invention relates to a method for adjusting the doors of a landing gear bay of an aircraft and to a door for implementing this method.

By convention, the landing gear of an aircraft is able to be retracted into and deployed from a bay formed in the hold of an aircraft via a set of mobile doors. This set comprises two longitudinal front doors and two rear doors of smaller surface area, the doors being articulated along their opposite sides in order to offer an opening through which the gear can pass.

A fifth door referred to as a "fixed door" is mounted on the landing gear leg in a position which allows it, when the landing gear is retracted, to become inserted in a cutout formed in the front and/or rear doors. The fixed door constitutes a homogeneous assembly, performing both a structural stiffening function and an aerodynamic function of ensuring the continuity of the "bodywork".

After the takeoff phase, the deployed landing gear reenters the bay following opening of the front doors then closure of all the doors once the landing gear has been retracted. During the landing phase, a reverse mechanism is performed: all the doors open to allow the landing gear out, then once the gear is out, the front doors are closed again in order to prevent turbulent air around the open doors as this generates aerodynamic noise and drag. Depending on the configuration of the landing gear, the rear doors may close again as well as or instead of the front doors.

The cutout in the front doors thus allows these doors to close again completely even though the landing gear leg and stay remain deployed. The aircraft therefore lands with the front doors closed and these remain closed until the next takeoff.

PRIOR ART

During initial commissioning of the aircraft and during ground overhaul operations, the doors are adjusted in terms of position along two or three axes, in order to achieve the best aerodynamic positioning of the doors with respect to one another and with respect to the aircraft fuselage. The aerodynamic flushness of the doors and the clearances between the doors, via their seals, are then finalized.

Such adjustments are performed using a set of mechanical components with variable geometry—variable both in terms of angle and in terms of travel—for example link rods the lengths of which can be adjusted by screw jacks or the equivalent. Adjustment is carried out in successive steps, starting with the adjustment of the front and rear doors, the fixed door usually being adjusted last. This is because the handles for adjusting the fixed door allow it to be adapted to suit the positions of all the other doors that have already been adjusted.

Now, after each step in the adjustment process, the doors have to be opened and closed again, and the landing gear has to be deployed and then retracted, in order to check the adjustment of the door because the adjusting handles are inaccessible from the outside. Each adjustment therefore takes a great deal of time: for example, adjusting the rear doors and the fixed door alone occupies two operators for 6 hours each. In addition, each adjustment is dangerous because the hydraulic system used to operate the doors is then in operational mode: that being the case, the system has to be made safe for each door-opening maneuver.

SUMMARY OF THE INVENTION

The invention seeks to achieve adjustment of all of the doors without multiplying the number of landing gear deployment/retraction and door opening/closing maneuvers, thus making it possible to improve this adjustment significantly both in terms of safeness and in terms of time taken. This time saving is achieved at the time of manufacture and during each overhaul or maintenance operation, so maintenance costs are thus appreciably reduced.

In order to achieve this, the invention plans to incorporate into the fairing of the landing gear bay a special access to the various door adjustment accessories.

More specifically, one subject of the invention is a method for adjusting doors of a bay for landing gear of an aircraft having an overall fuselage, the landing gear being able to deploy out of the bay via the doors formed in the fuselage and the doors being adjusted using position-adjustment handles that are inaccessible from outside the bay. The method consists in providing a removable bodywork, in at least one door, surrounded by a stiffening structure, and of a size large enough that the adjusting handles, to be accessed by retracting this removable bodywork into the bay, can be reached from the outside and so that the positions of the various doors, i.e. the flushness positions or other positions or else the clearances between these doors, can be adjusted, using the handles.

Thus, unlike the earlier handle-access means, the means according to the invention provide two distinctly located zones with different mechanical properties—aerodynamic and structural—whereas the earlier means perform these two functions at one and the same location and using one and the same homogeneous zone.

In particular, the removable bodywork may be formed in an unpressurized zone of the fuselage or of a fairing formed on this fuselage, particularly facing the landing gear bay, and advantageously in the fixed door, so as to access the fixed door adjusting handles. This access makes it possible to adjust the position and clearance between the fixed door and the other doors that surround it in a single step, i.e. without deploying and retracting the landing gear in order to check the adjustment.

The invention also relates to a landing gear bay door for implementing the above method. Such a door comprises a central bodywork part and a peripheral part comprising stiffening means. The peripheral part is surrounded by a seal (30) bearing, via the stiffening means, against other doors, and the central part is coupled by removable separation means to the peripheral part.

Advantageously, the door is coupled to means of mounting on the landing gear so that when the gear is retracted it is surrounded by and bears against the other doors of the landing gear bay fairing.

In particular, the stiffening and bearing means consist of reinforcing means located only in the peripheral part. That being the case, the structural function of the door in the overall structure of the fuselage or in the secondary structure of the fairing is concentrated into the peripheral part. The removable bodywork part is thus created in a structural component that has been reinforced in order to accommodate it. The reinforcing means may be chosen between metal ribs and a composite material, for example having a carbon or ceramic matrix, or equivalent means.

BRIEF DESCRIPTION OF THE FIGURES

Other data, features and advantages of the present invention will become apparent from reading the nonlimiting description which follows, with reference to the attached figures which respectively depict.

DETAILED DESCRIPTION

The qualifiers "front" and "rear" used in the present text relate to the central line of the aircraft, the cockpit being at the front and the tail assembly at the rear.

Figure 1:
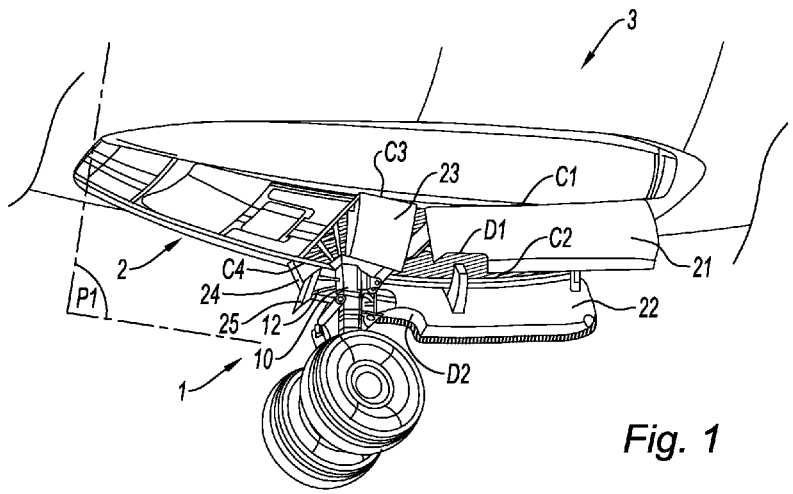
FIG. 1: a schematic perspective view of a landing gear deployed through the openings of the doors in the fairing of the landing gear bay.

With reference to FIG. 1, the landing gear 1 of an aircraft is deployed from a fairing 2, through the open front doors 21 and 22 and the open rear doors 23 and 24. The aircraft has an overall fuselage 3 into which the fairing 2, formed under the aircraft, is aerodynamically incorporated. The fairing is optional depending on the overall configuration of the aircraft. The doors in the fairing 2 provide access to the landing gear bay 4 (see FIG. 2) in which the landing gear is housed when retracted. The bay forms part of the hold of the aircraft.

The entire fairing and landing gear exhibit symmetry about the median plane P1. The front and rear doors are articulated along their respective opposite sides C1/C2 and C3/C4 positioned furthest from the plane of symmetry P1.

In flight, whether during maneuvers performed with a view to landing or following takeoff, the front doors 21 and 22 remain open only for phases limited to the deployment or, respectively, the retraction of the landing gear. These landing and takeoff phases are performed by hydraulic actuating cylinders: one actuating cylinder per front door to open or close them, the landing gear remaining in position, and one actuating cylinder that moves the landing gear between a rest position inside the bay and a deployed position outside the bay, driving the other doors as well.

The front doors are closed again after the landing gear has been deployed ready for landing in order not to cause turbulent air that manifests itself in the form of aerodynamic noise and an increase in drag. In order for the front doors 21 and 22 to be able to close again while the landing gear 1 is deployed, symmetric cutouts D1 and D2 have been made in the front doors 21 and 22 respectively. In other configurations, the cutouts may also or only be formed in the rear doors. The cutouts may equally well not be symmetrical.

Figure 2:
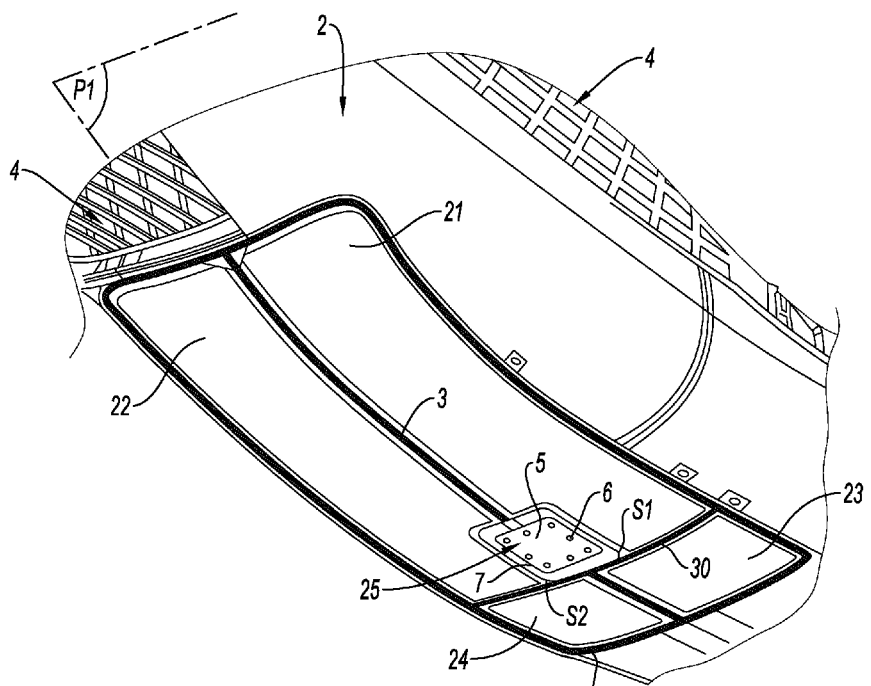
FIG. 2: a schematic perspective view of all the doors of the fairing in the closed position, the fixed door being a door according to the invention.

In order to fill the opening formed in the fairing by these cutouts D1 and D2 when the landing gear is retracted, a door referred to as a fixed door 25 is provided. This door 25 is mounted on the leg 10 of the landing gear 1 via fixed arms 12. FIG. 2 illustrates the position of the fixed door 25 when the landing gear is retracted into its bay 4. The fairing has been partially cut away in order to show the bay 4. In this figure all the doors—21 to 25—are closed. Such a configuration corresponds to steady flight phases.

The front doors 21 and 22 and rear doors 23 and 24 are adjusted by stacking calibrated washers and by abutment and screws between them and the fairing or the fuselage. In general, the front doors are adjusted first of all with respect to the fairing or to the fuselage and then the rear doors are adjusted to suit the front doors and the fuselage or the fairing.

When the doors have been correctly positioned during the last ground intervention, by fine adjustment of the positioning handles, optimized flushness is established between the doors 21 to 25 and between the doors and the fairing 2. The adjustment also seeks to allow the seals 30 surrounding the doors to apply sufficient force to ensure a good sealing of all of the doors, and good connection between the doors 21-25 and the fairing 2, without these seals becoming deformed.

The fixed door 25 is of rectangular overall shape, with two chamfered vertices S1 and S2. This door has a removable central part 5, in the example mounted by means of a series of bolts 6 on a peripheral part 7 of the door 25. The fit of the central part 5 is preadjusted at the workshop using mastic and this fit will not be revised during the life of the aircraft under standard conditions of use. During overhaul or maintenance, the central part 5 is removed, providing access to the handles that adjust the flushness spacer pieces of the other doors. The ease of removal of the central part 5 of the fixed door 25 means that optimized adjustment can be achieved in a single step, without the need to deploy the landing gear in order to access the adjusting handles or to repeat the landing gear retraction/deployment maneuvers several times over in order, like in the prior art, to finalize a correct adjustment.

Figure 3:
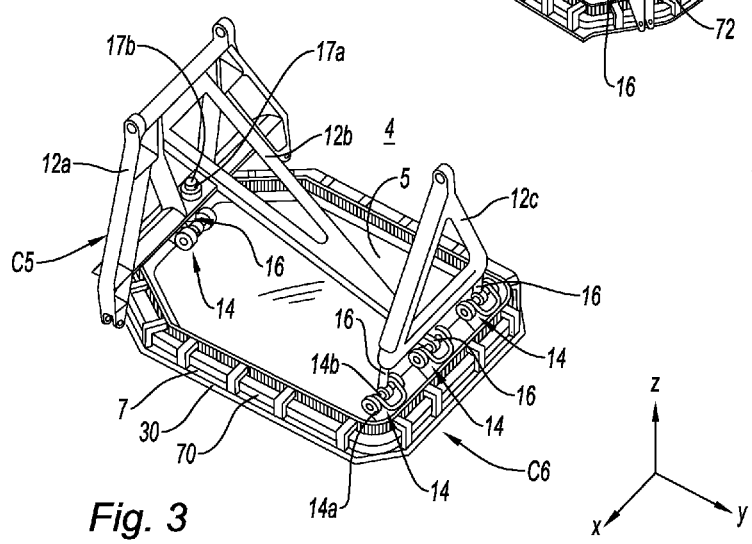

FIG. 3 is a perspective illustration of the fixed door 25 accommodating the adjusting spacer pieces, more specifically three spacer pieces 12a, 12b and 12c and adjusting handles 14, in an interior view of the bay 4. In the case of a door structure made of metal alloy, the peripheral part 7, surrounded by the seal 30, has stiffening ribs 70 which, for aerodynamic reasons, are present only on the inside of the bay 4 when the landing gear is retracted. As an alternative, the structure of the peripheral part 7 may be made of a reinforced non-metallic material, Kevlar or carbon for example. Other reinforcing means may also be used: composite fibers, frameworks incorporated at the time of manufacture, etc.

The central part 5 has a configuration of "bodywork" type, free of any reinforcing means. The adjusting handles 14 consist of studs comprising crank pins 14a which, when turned, cause a translational displacement of a rod 14b. The bases 16 of the spacer pieces 12a to 12c are mounted on the rods 14b and undergo the translational movement of the rod 14b when the crank pins 14a are turned. The spacer piece 12b is mounted on the spacer piece 12a on one side C5 of the substantially rectangular door 25. The base of the spacer piece 12b bears against a handle positioned on the other width C6, between the bases of the third spacer piece 12c. The spacer piece 12c is transverse and the set of spacer pieces allows the doors to be adjusted in three directions XYZ, in two directions XY or in just one direction Z. The doors are adjusted for flushness in a pre-established and known order.

Nuts and washers 17a, 17b allow for additional adjustments, for example in terms of the height of the bases 16. Other handles, not depicted, allow relative adjustment of the front and rear doors 21 to 24 with respect to the fixed door 25. These handles are positioned on the internal face of these surrounding doors in close proximity to the fixed door and can be accessed from the outside when the central part 5 of the fixed door 25 is removed.

Figure 4:
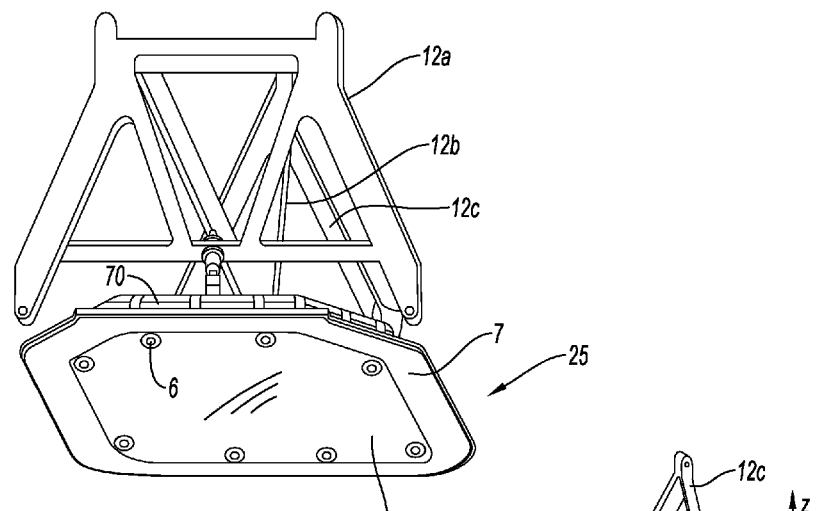
FIGS. 3 and 4: two schematic perspective views of a fixed door according to the invention with door adjustment accessories, these being a view from inside the bay (FIG. 3) and a view from outside the bay (FIG. 4)

This central part 5 has, when viewed from outside the aircraft as illustrated by the exterior view of the fixed door 25 in FIG. 4, an aerodynamic configuration known as a bodywork configuration. In particular, since the resistance to load and the bearing on the other doors are afforded by the peripheral part 7, the central part 5 is of a thickness appreciably less than that of the peripheral part 7. This figure also shows the bolts 6 for the removable attachment of the central part 5, the spacer pieces 12a to 12c, the reinforcing ribs 70 of the peripheral part of the door 25. As an alternative, the central bodywork part 5 may be coupled removably to the peripheral part 7 of the door 25 by magnetic locking means combined with safety means, a hinge system combined with a removable locking means, or the equivalent.

Figure 5:
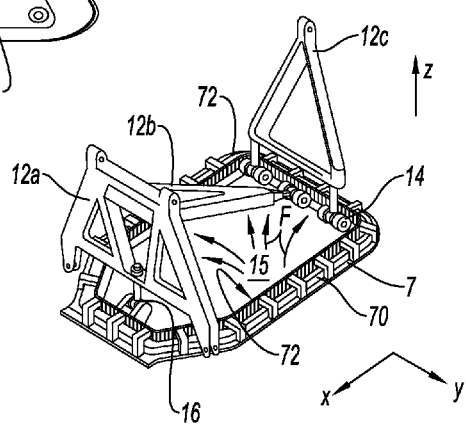
FIG. 5: a schematic partial perspective view of the door according to FIG. 4 without the central bodywork part.

When the central part 5 of the fixed door 25 is removed, this door has, when viewed from inside the bay, the appearance shown in the schematic view of FIG. 5. This view reuses the references of FIG. 3 to denote elements that are identical, and the corresponding description applies likewise in support of FIG. 5. Once the central part has been removed, the opening 15 allows access to the studs 14 (arrows F) and other washers that are used to adjust the flushness of the doors.

A rib 72, formed along the peripheral part 7, serves as an abutment for handles for adjusting the front and rear doors surrounding the fixed door. These handles are therefore also accessible from the outside through the opening 15. The front and rear doors moreover have XY adjustment means likewise accessible through the opening 15.

The invention is not restricted to the embodiments described and depicted. Thus, the central bodywork part may be of varied shape, suited to the configuration of the peripheral part: rectangular, polygonal, elliptical, etc. Moreover, various means of removably fixing the removable central part can be used by way of removable locking or safety means provided they comply with the "bodywork" function of the central part. These include: clipping means, hooks, tenons and mortises, etc. The means of opening the central part may also be disconnected from inside the aircraft.

The invention claimed is:

1. A method for providing adjustable doors of a bay for landing gear of an aircraft having an overall fuselage, the landing gear being able to deploy out of the bay via doors formed in the fuselage and the doors being adjusted using position-adjustment handles that are inaccessible from outside the bay, the method comprising:
   providing a removable bodywork in at least one door,
   applying a stiffening structure to a surface of the removable bodywork, and
   positioning the position-adjustment handles proximate to the removable bodywork, wherein the position-adjustment handles are configured to be accessed from outside of the fuselage by removing the removable bodywork and reaching through an opening formed by removing the bodywork and reaching into the bay, such that the position-adjustment handles are reachable from outside of the fuselage to adjust positions of the doors.

2. The method for adjusting doors as claimed in claim 1, in which the removable bodywork is formed in an unpressurized zone of the fuselage or in a fairing formed on the fuselage.

3. The method for adjusting doors as claimed in of claim 1, in which the removable bodywork is formed in a fixed door and the adjustment of the position-adjustment handles adjusts a relative position between the fixed door and the other doors.

4. A landing gear bay door assembly comprising:
   a door including a central bodywork part including a peripheral part extending around the central bodywork;
   a stiffener mounted to a surface of the peripheral part,
   the door configured to open while a landing gear extends from or retracts into a bay of a fuselage;
   a seal bearing extending around the peripheral part and configured to form a seal between the door and other doors while all of the doors are closed, and
   the central bodywork part being coupled by removable fastener to the peripheral part.

5. The door as claimed in claim 4, wherein the door is mounted to a wheel strut.

6. The door as claimed in claim 5, wherein the central body work is a panel.

7. The door as claimed in claim 4, in which the stiffener includes at least one of metal ribs and a composite material.

8. The door as claimed in claim 7, wherein the central bodywork part is coupled removably to the peripheral part of the door by at least one of screw/nut assemblies, a magnetic lock.

9. A landing gear bay door assembly for an aircraft fuselage comprising:
   a first door including a central bodywork panel and a peripheral door part extending around the perimeter of the central bodywork panel, wherein the central bodywork panel is removable from the peripheral door part;
   a stiffing rib mounted to a surface of the peripheral door part;
   second and third doors pivotably attached to the aircraft fuselage, wherein the second and third doors each have an edge adjacent an edge of the first door while the first, second and third doors are closed;
   an adjusting mechanism configured to spatially the first doors relative to the second and third doors, wherein the adjusting mechanism is accessible through an opening formed by removal of the central bodywork panel;
   a seal bearing extending around the peripheral part and configured to form a seal between the central bodywork and the edges of the second and third doors.

10. The landing gear bay door assembly of claim 9 wherein the first door is fixed to a wheel strut of a landing gear.

11. The landing gear bay door assembly of claim 9 wherein a thickness of the first door is smaller than a thickness of the peripheral part.

12. The landing gear bay door assembly of claim 9 wherein the edges of the second and third doors are opposite to hinged edges of the second and third doors.

* * * * *